United States Patent
Tsuruta et al.

(10) Patent No.: US 11,340,382 B1
(45) Date of Patent: May 24, 2022

(54) SENSOR SYSTEM ON A LINE FOR MEASURING ATMOSPHERIC CONDITIONS

(71) Applicant: Toyota Motor Engineering & Manufacturing North America, Inc., Plano, TX (US)

(72) Inventors: Ryohei Tsuruta, Ann Arbor, MI (US); Umesh N. Gandhi, Farmington Hills, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/169,729

(22) Filed: Feb. 8, 2021

Related U.S. Application Data

(60) Provisional application No. 63/130,457, filed on Dec. 24, 2020.

(51) Int. Cl.
*G01W 1/06* (2006.01)
*G01W 1/10* (2006.01)

(52) U.S. Cl.
CPC .............. *G01W 1/06* (2013.01); *G01W 1/10* (2013.01)

(58) Field of Classification Search
CPC .................................. G01W 1/06; G01W 1/10
See application file for complete search history.

(56) References Cited

U.S. PATENT DOCUMENTS

| 5,913,247 A | 6/1999 | Steuer |
| 10,317,570 B2* | 6/2019 | Lilien ...................... H02G 1/02 |
| 10,416,009 B1 | 9/2019 | Miller et al. |
| 2004/0168523 A1 | 9/2004 | Fernald et al. |
| 2013/0277941 A1* | 10/2013 | Ryan .................... B62K 15/006 280/278 |
| 2015/0153741 A1* | 6/2015 | North ....................... F03D 7/00 290/44 |
| 2017/0363067 A1* | 12/2017 | Hart ......................... F03D 5/00 |
| 2020/0233411 A1* | 7/2020 | Ivanov ................. G05D 1/0022 |
| 2021/0063603 A1* | 3/2021 | Candido ............. G06N 3/0454 |

FOREIGN PATENT DOCUMENTS

| KR | 101746437 B1 | 6/2017 |
| WO | 2012014319 A1 | 2/2012 |

OTHER PUBLICATIONS

Harish Singh, "Piezoelectric Sensor For Vortex Flow Meter," Sensors forum, pp. 1-5, Apr. 2019.
(Continued)

*Primary Examiner* — Yoshihisa Ishizuka
(74) *Attorney, Agent, or Firm* — Christopher G. Darrow; Darrow Mustafa PC

(57) ABSTRACT

System and other embodiments described herein relate to a sensor system used on a control line that measures atmospheric conditions. In one embodiment, a sensor system may have a main body attached to a line. The sensor system may use a directional sensor that determines direction of airflow according to rotation of the main body about the line. The sensor system may also have a generator coupled to the main body. The sensor system may also use a flow sensor that measures speed of the airflow according to a vortex generated from rotation of the generator in open air.

20 Claims, 4 Drawing Sheets

(56) References Cited

OTHER PUBLICATIONS

Roberto Marsili, "An airflow vortex-shedding flowmeter with PVDF piezoelectric film sensors: development and characterization," International Journal of Engineering Science and Innovative Technology, vol. 4, issue 4, pp. 75-81, Jul. 2015.
Unknown, "Strouhal number," 4 pages, last accessed Jan. 2021, found at https://en.m.wikipedia.org/wiki/Strouhal_number.
A. Bouferrouk, "Vortex flow," The International Vehicle Aerodynamics Conference, Woodhead Publishing, 2014, pp. 101-111, found at https://www.sciencedirect.com/topics/engineering/vortex-flow.
Unknown, "Absolute orientation sensor BMX055," Bosch Sensortec, 8 pages, 2020.
Unknown "The New Internet of Moving Things," mCube, 4 pages, last accessed Feb. 5, 2021.
Unknown, "MEMS magnetic field sensor," 7 pages, last accessed Dec. 14, 2020, found at https://en.wikipedia.org/wiki/MEMS_magnetic_field_sensor.
Javor et al., "100 pT/cm single-point MEMS magnetic gradiometer from a commercial accelerometer," Microsystems and Nanoengineering, vol. 6, article No. 71, pp. 1-13, 2020.

* cited by examiner

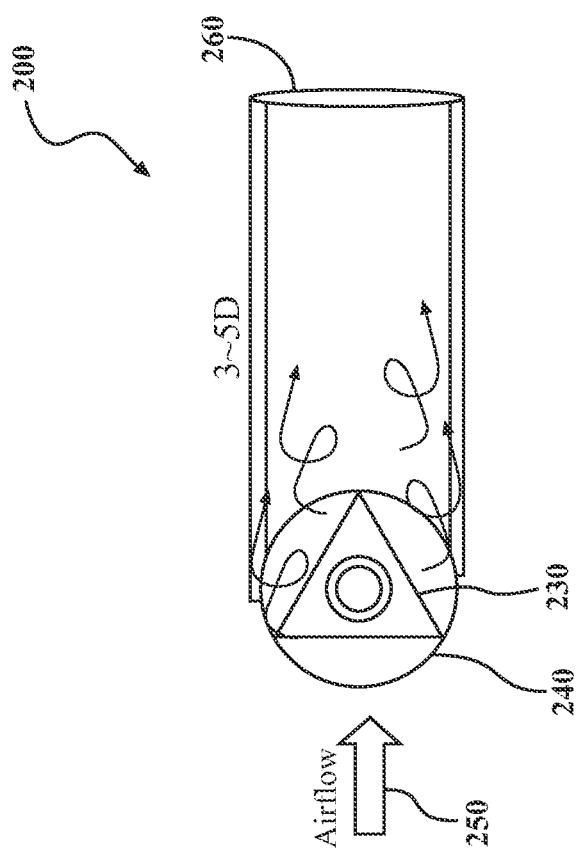
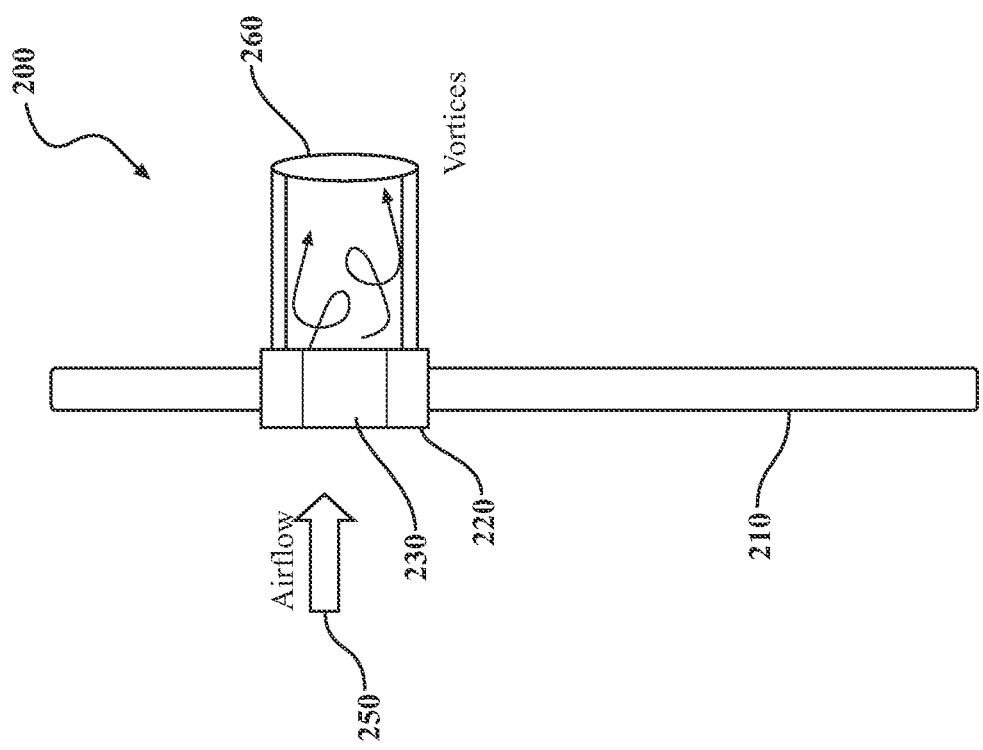
FIG. 2A
FIG. 2B

SENSOR SYSTEM ON A LINE FOR MEASURING ATMOSPHERIC CONDITIONS

CROSS-REFERENCE TO RELATED APPLICATIONS

This application claims benefit of U.S. Provisional Application No. 63/130,457, filed on, Dec. 24, 2020, which is herein incorporated by reference in its entirety.

TECHNICAL FIELD

The subject matter described herein relates, in general, to a flying device, and, more particularly, to a sensor system on a line of the flying device.

BACKGROUND

A weather forecasting system may use a sensor(s) to measure atmospheric conditions. For example, the sensor(s) may measure wind characteristics used to forecast the weather. In order to accurately forecast the weather, the sensor may need to measure the wind characteristics to a certain degree at different levels of the atmosphere.

A flying device may include the sensor(s) to measure atmospheric conditions. For instance, a weather forecasting system may use a sensor(s) on a kite, glider, or balloon to gather measurements and data. A kite may include a main body, a bridle, and a line. The bridle and the line help an operator control the kite. In flight, the kite may be controlled by a person or device using the line. The kite pivots and dives about the point where the bridle connects to the line.

At certain altitudes, the flying device may experience drag and force caused by airflow on the line. The line effect may be non-negligible. For instance, the force by the airflow on the line may hamper flight and increase drag. A sensor(s) weight and position on the flying device may also increase drag and reduce lift. Accordingly, the flying device may operate sub-optimally due to the line and sensor(s).

SUMMARY

In one embodiment, example systems and methods relate to a manner of improving a sensor system used on a control line(s) of a flying device that measures atmospheric conditions. In various implementations, a sensor system on a control line may increase drag and reduce lift. Furthermore, at certain altitudes a flying device may experience turbulence and varying drag due to force from airflow changes over time on the control line. Accordingly, a sensor system on a control line uses an improved sensor configuration for measuring atmospheric conditions to forecast weather and improve flight. The sensor system on a control line(s) uses a purpose-built form and generator in air to measure the speed and direction of airflow at various altitudes more effectively. The purpose-built form may utilize a tear-drop shape to reduce a weight and drag penalty on the flying device while maintaining measurement accuracy. The generator may form a vortex, such as a Karman vortex, from air or wind in the atmosphere without an enclosure and other additional components thereby reducing the weight penalty of the sensor system. The sensor system may communicate data from the measurements to other sensor systems along the control line at various altitudes that a station uses to forecast weather more reliably. Furthermore, the sensor system may also use the data to determine the force on the control line(s) to improve control of the flying device.

In one embodiment, a sensor system used on a line(s) that measures atmospheric conditions is disclosed. In one embodiment, the sensor system may have a main body attached to a line. The sensor system may use a directional sensor that determines direction of airflow according to rotation of the main body about the line. The sensor system may also have a generator coupled to the main body. The sensor system may also use a flow sensor that measures speed of the airflow according to a vortex generated from rotation of the generator in open air.

In one embodiment, a sensor system used on a control line(s) of a flying device that measures atmospheric conditions is disclosed. In one embodiment, the sensor system may have a main body attached to a control line of a flying device. The sensor system may use a magnetic sensor that determines direction of airflow according to rotation of the main body about the control line. The sensor system may also have a generator coupled to the main body. The sensor system may also use a flow sensor that measures speed of the airflow according to a vortex generated from rotation of the generator in air.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 2A and 2B illustrate one embodiment of a sensor system attached to a line that generates a vortex to measure the speed of airflow and measures direction.

DETAILED DESCRIPTION

Figure 1:
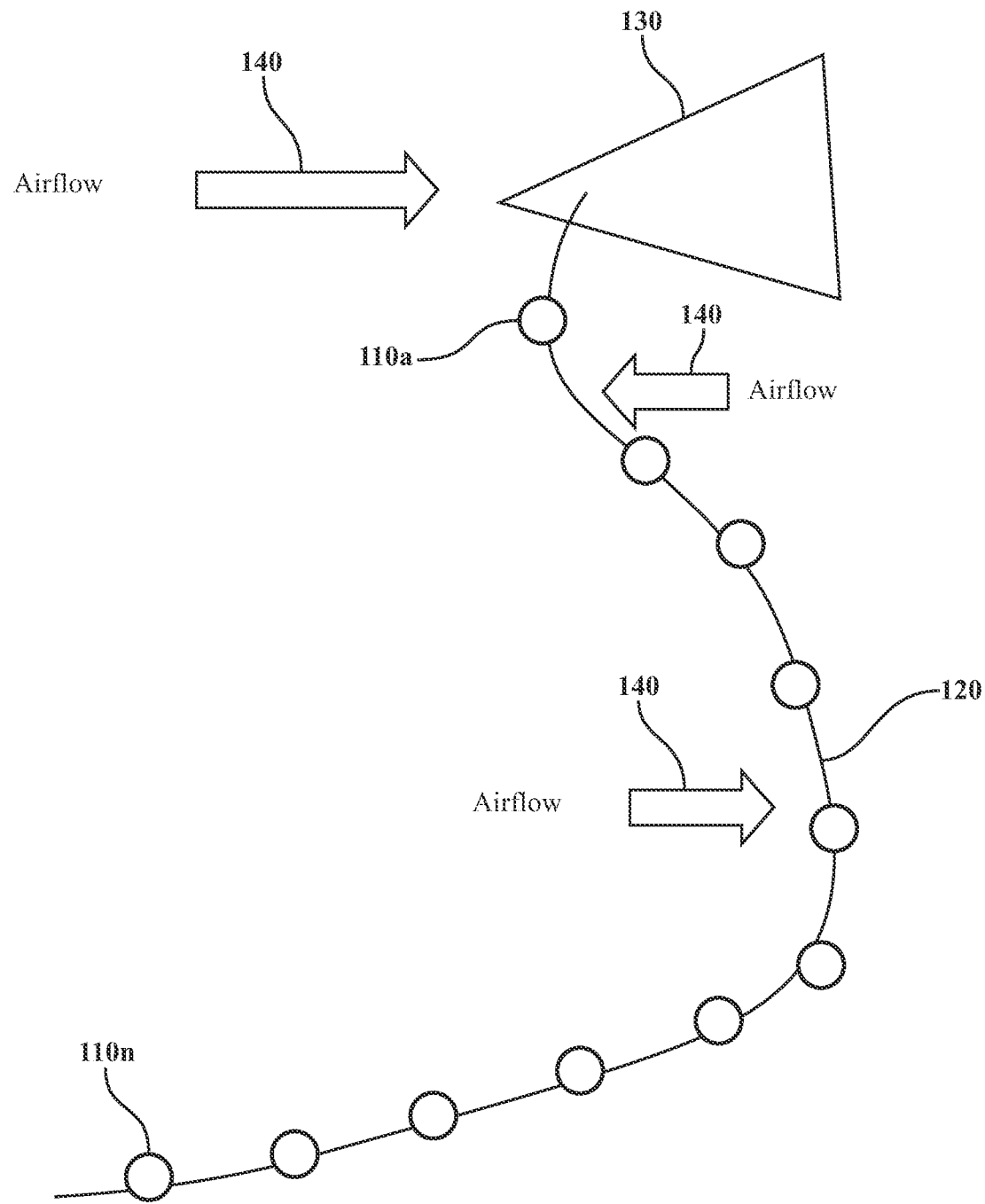
FIG. 1 illustrates one embodiment of a sensor system attached to a line of a flying device.

Systems, methods, and other embodiments associated with a manner of improving a sensor system attached to a control line(s) that measures atmospheric conditions are disclosed herein. A sensor system may rotate about the control line(s), such as a tether, to make measurements by facing the direction of airflow. To reduce noise measurements caused by obstructions, trees, or buildings the sensor system may be positioned above a minimum altitude on the control line(s). The sensor system may use a generator that sheds airflow or functions as a bluff body that creates vortices in open air to accurately measure the speed of airflow. In an open air configuration, the generator may be unenclosed in the sensor system. In one approach, flat surfaces of the generator may function as a bluff body to separate airflow for measurements. Furthermore, the sensor system may also use a tear-drop shape to further reduce a weight and drag penalty caused by airflow on the sensor system. Accordingly, an open air operation of the generator and a tear-drop shape may accurately measure the speed of airflow without adding weight and drag.

Moreover, the sensor system may use a sensor composed of lightweight conductive materials, such as polyvinylidene fluoride (PVDF), to measure the speed of the airflow according to vibration, impingement, or fluctuation of a force over time to the surface of the sensor by vortices. The sensor may determine the vortex generation frequency that is proportional to the speed of the airflow. Therefore, the sensor may measure the speed of the airflow by detecting the number of the vortices or pulses created by the vortices. Furthermore, the sensor system may use a directional or magnetic sensor that determines the direction of the airflow according to the rotation of the sensor system about the control line. The directional or magnetic sensor may be a lightweight microelectromechanical system (MEMS) sensor. The MEMS sensor may communicate with an orientation of the sensor system to accurately determine the direction. In this way, the sensor system may accurately determine the speed and direction of the airflow in a simplified arrangement using a PVDF and MEMS sensor.

Moreover, the control line may include multiple sensor systems to measure the speed and direction of the airflow to accurately forecast weather. A receiver on a sensor system may receive speed and direction of airflow measurements from additional sensor systems attached to the control line using device-to-device or peer-to-peer communications. A transmitter may transmit the measured speed and direction of the airflow and relay the measurements from the additional sensor to another sensor system attached to the control line. Accordingly, the sensor systems measure the speed and direction of the airflow at various altitudes and relay the measurements to a station or centralized controller to reliably forecast weather.

In addition, the station or centralized controller may determine the force on the control line from measured speed and direction of the airflow to adapt the tension of the control line. For example, an increase or decrease of the tension may result in the steadier flight of the flying device attached to the control line as a result of mitigating drag. In this way, the sensor system measures the speed and direction of the airflow at various altitudes to reliably forecast weather and improve the operation of the control line without adding a weight and drag penalty.

FIG. 1 illustrates one embodiment of the sensor system $110_a$ attached to a line 120 of a flying device 130. The flying device 130 may be a kite, glider, balloon, and so on. The airflow 140 may lift and suspend the flying device 130. The line 120 may be a control line or tether that controls the flying device 130 to pivot and dive about a point where the line 120 couples to the flying device. In one approach, the line 120 may be coupled to a station on the ground that controls tension according to flight or weather parameters. For example, a flight parameter may specify that the flying device reaches a certain minimum altitude to properly measure airflow or wind speed and direction for weather forecasting. A minimum altitude may be needed to fly above objects, obstructions, trees, or buildings that add noise to measurements by the sensor system $110_a$. In particular, the sensor systems $110_a$ to $110_n$ make open air measurements of airflow that may be highly sensitive to noise caused below the minimum altitude. In an open air configuration, the generator may be unenclosed in the sensor system $110_a$. In addition, the weather parameter may indicate an altitude needed for the sensor system $110_a$ to avoid air currents caused by fluctuating barometric pressure.

The sensor system $110_a$ may measure the speed and direction of the airflow 140 at various altitudes along the line. For example, the sensor systems $110_a$ to $110_n$ may be distributed in intervals of 50M-100M or staggered. However, the sensor systems $110_a$ to $110_n$ may be attached at intervals or spacing to meet a measurement goal. In particular, the speed and direction for the airflow 140 may be needed at various altitudes in order to reliably forecast weather. Above a certain minimum altitude, the sensor system $110_a$ may use a generator that sheds airflow and/or functions as a bluff body in open air.

Moreover, as explained below the generator and the sensor may be coupled to a main body attached to the line 120. The sensor system $110_a$ may use sensors that measure the speed and direction of the airflow according to vortices generated from the rotation of a generator in open air and rotation of the sensor system about the line. In one approach, the sensor system may include a flowmeter that measures the speed of the airflow according to vibration, impingement, or fluctuation of a force over time to the surface of a sensor. The vortices may also be Karman vortices that are measured by the sensor downstream. Furthermore, the sensor may be composed of lightweight conductive materials, electro-active polymers (EAP), flexible conductive plastics, a piezoelectric effective material, PVDF, acoustic sensing materials, and so on to avoid a weight penalty.

In addition, a receiver on the sensor system $110_a$ may receive the speed and direction of airflow measurements from additional sensor systems attached to the line 120. A transmitter may transmit the measured speed and direction of the airflow and relay the measurements from the additional sensor to another sensor system attached to the line 120 or a controller. The speed and direction of airflow measurements may be received and transmitted using point-to-point, device-to-device, peer-to-peer communications, third generation partnership program (3GPP) proximity services (ProSe), Wi-Fi direct, 802.11x direct, ad-hoc communications, and so on. In this way, the sensor systems $110_a$ to $110_n$ measure the speed and direction of the airflow at various altitudes and relay the measurements to a station or centralized controller to reliably forecast weather.

Moreover, the airflow 140 may also cause drag by force on the line 120. Depending on the type of the flying device 130, the drag may create a non-negligible control line or tether effect. For instance, flight for a kite or a glider may be substantially hindered due to the control line or tether effect. Accordingly, a station, ground station, controller, and so on associated with the flying device 130 may determine the force on the line 120 according to measured speed and direction of the airflow to adapt the tension of the line 120. For example, an increase or decrease of the tension may result in the steadier flight of the flying device 130 as a result of mitigating drag.

FIGS. 2A and 2B illustrate one embodiment of a sensor system 200 attached to a line 210 that generates a vortex to measure the speed of airflow and measure direction. In one approach, the sensor system 200 may be attached to the line 210 using fasteners, clamps, or a ring with ball bearings 220 to allow rotation of the generator 230. The line 210 may be a control line or tether that controls another device, such as a flying device. In this way, the sensor system 200 may function as a vane, such as a weather vane, by rotating about the line 210 to face the direction of the airflow. As explained below, the sensor system 200 may use a directional sensor that determines direction according to the rotation of the main body associated with the sensor system 200.

Furthermore, the sensor system 200 may include the generator 230 that generates one or more vortices in open air by rotation 240 that sheds the airflow 250. In an open air configuration, the generator 230 may be unenclosed in the sensor system 200. In one approach, one or more flat surfaces of the generator 230 may function as a bluff body to separate airflow for measurements. The sensor 260 may be a flowmeter that measures the speed of the airflow 250 according to vibration, impingement, or fluctuation of a force over time to the surface of the sensor 260. The speed of the airflow 250 and the vortex generation frequency may be proportional allowing the sensor system 200 to determine the speed of the airflow 250. Therefore, the sensor system 200 may measure the speed of the airflow 250 by detecting the number of the vortices or the pulses created by the vortices.

In addition, in various implementations the sensor 260 may be positioned at a distance D associated with the rotation diameter of the generator 230 to accurately measure the speed of the airflow 250. For example, the sensor may be positioned a distance of 3D-5D from the generator 230. The distance 3D-5D may represent a steady point for vortices generated. The parameter D may be a known width or diameter associated with the generator 230. Furthermore, the vortices may be Karman vortices that are measured by the sensor 260 downstream. The sensor may be composed of lightweight conductive materials, EAP, flexible conductive plastics, a piezoelectric effective material, PVDF, acoustic sensing materials, and so on.

For certain applications, a Karman vortex and PVDF may generate accurate measurements of the airflow 250 without adding to a weight penalty. Airflow measurements of a Karman vortex may be made according to the following relationship:

$$f=St*V/D. \qquad \text{Equation (1)}$$

In Equation (1), the variable f is the vortex frequency, St the strouhal number, V the average speed of airflow, and D a known width or diameter associated with a generator. In this way, the sensor system 200 may determine the average speed of airflow V according to the measured vortex frequency f and the known diameter D.

Figure 3A:
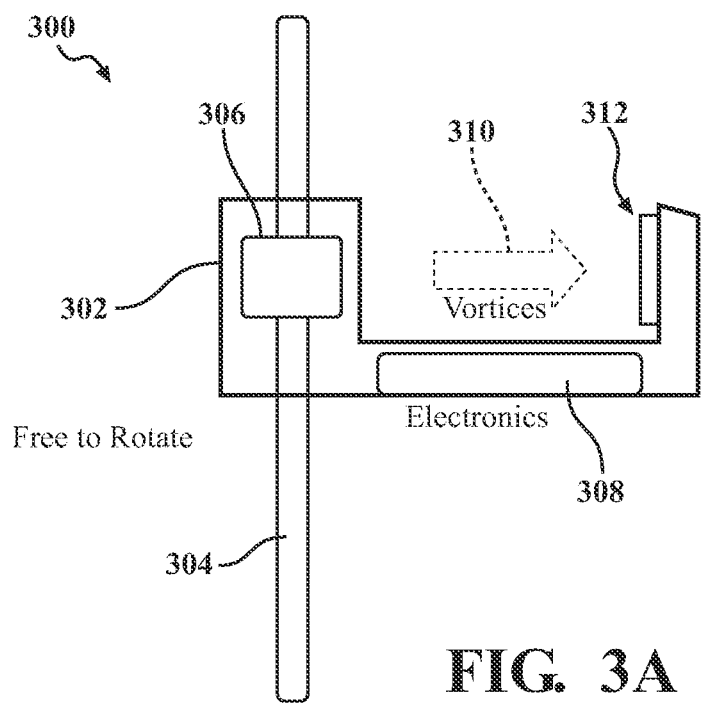
FIGS. 3A-3D illustrate operation and views of the sensor system and a tear-drop shape for the body.

FIGS. 3A-3D illustrate operation and views of a sensor system 300 and tear-drop shape for the body. In FIG. 3A, the sensor system 300 includes an enclosure 302 that houses generator 306 and electronics 308. The sensor system 300 may be attached to line 304 using fasteners, clamps, or a ring with ball bearings to allow rotation of the generator 306. The line 304 may be a control line or tether that controls another device, such as a flying device. In this way, the sensor system 300 may function as a vane, such as a weather vane, by rotating about the line 304 to face the direction of the airflow. As explained below, the sensor system 300 may use a directional sensor that determines direction according to the rotation of the main body, associated with the sensor system 200, about the line 304.

As described above, the generator 306 may shed airflow by rotation to generate vortices 310. One or more flat surfaces of the generator 306 may also function as a bluff body to separate airflow for measurements. In this way, the sensor 312 can reliably measure the speed of airflow in a direction downstream from the generator 306. The sensor 312 communicates the measured speed of the airflow to electronics 308. In one approach, the electronics 308 may include a communications component, an orientation sensor, and a controller. The communications component may transmit and receive signals to other sensor systems or a centralized controller using point-to-point, device-to-device, peer-to-peer communications, 3GPP ProSe, Wi-Fi direct, 802.11x direct, ad-hoc communications, and so on. The sensor system 300 may use data from an accelerometer, gyroscope, or magnetometer of the orientation sensor for resolving airflow direction according to the orientation of the enclosure 302. For example, the orientation sensor may align in the direction of airflow and indicate an orientation angle in absolute terms. In one approach, the orientation sensor may be a MEMS used to reduce weight of the sensor system 300.

Figure 3B:
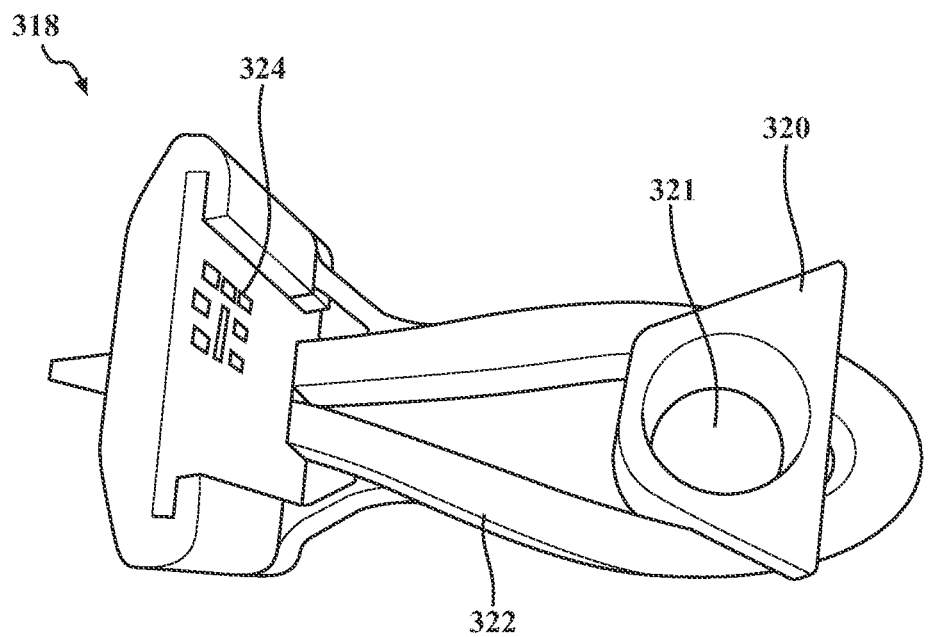

Turning to FIG. 3B, a sensor system 318 may include a tear-drop shape for the body 322. The tear-drop shape may reduce a weight and drag penalty for a system using the sensor system 318. In particular, the tapering of the tear-drop shape may reduce drag caused by airflow directed toward the sensor 324. The generator 320 and the body 322 may have a circular opening 321 for a line. The generator 320 may rotate about the line to shed airflow. The body 322 may rotate about the line for a sensor to determine the direction and the sensor to rotate in a position downstream from airflow.

Moreover, the generator 320 may generate one or more vortices in open air by rotation that sheds airflow in the direction of the sensor 324. In an open air configuration, the generator 320 may be unenclosed in the sensor system 318. In one approach, the generator 320 may be substantially triangular and the vortices may be Karman vortices measured by the sensor 324 downstream. Furthermore, one or more flat surfaces of the generator 320 may also function as a bluff body to separate airflow for measurements. The sensor 324 may be positioned a distance of 3D-5D from the generator 320. As explained above, the parameter D may be a known width or diameter associated with the generator 320. In particular, the distance 3D-5D may represent a steady point for vortices generated. Furthermore, the sensor 324 may be composed of lightweight conductive materials, EAP, flexible conductive plastics, a piezoelectric effective material, PVDF, acoustic sensing materials, and so on. In this way, the sensor system 318 may accurately measure the speed of airflow in open air without adding a weight or drag penalty.

Moreover, the sensor 324 may be a flowmeter that measures the speed of airflow according to vibration, impingement, or fluctuation of a force over time to the surface of the sensor 324. As explained above, the speed of the airflow and the vortex generation frequency may be directly proportional. Accordingly, the sensor system 318 may measure the speed of the airflow by detecting the number or pulses of the vortices without adding a weight and drag penalty for a system.

Figure 3C:
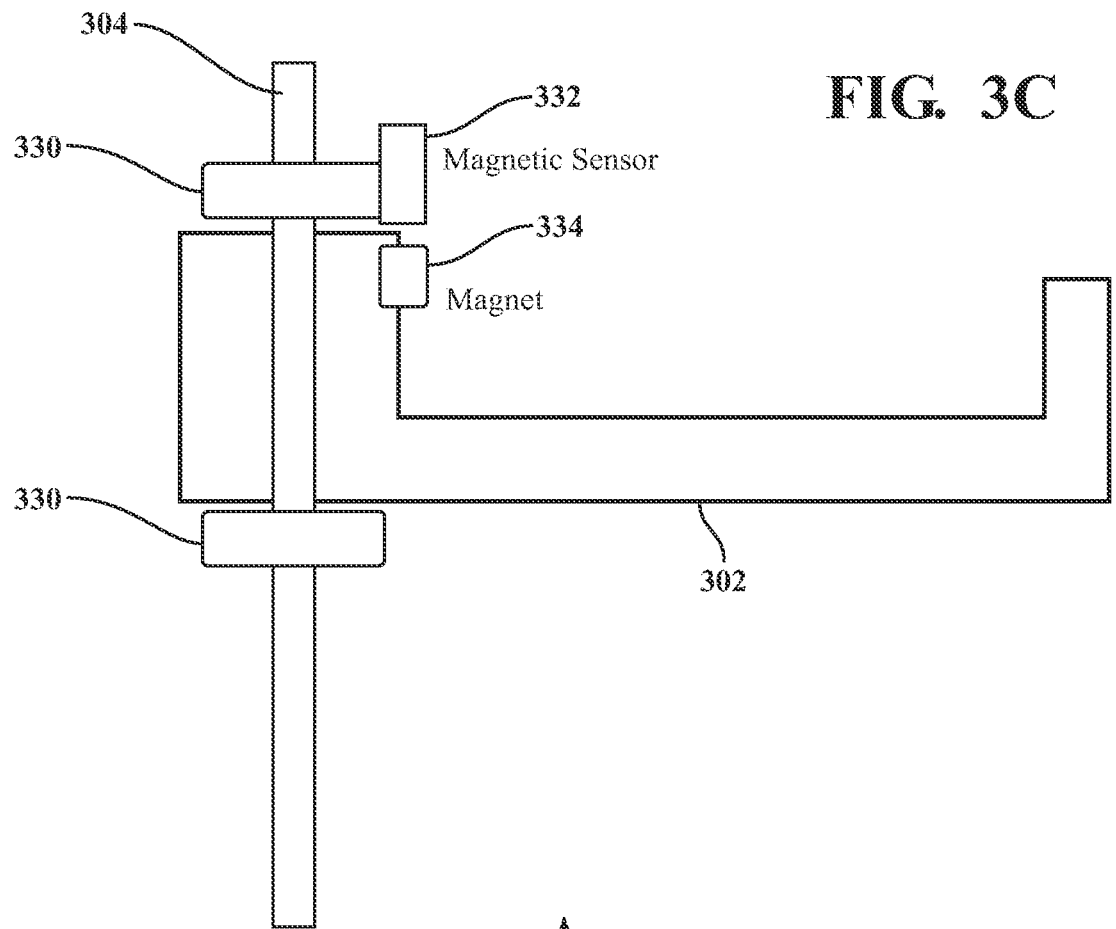
Figure 3D:
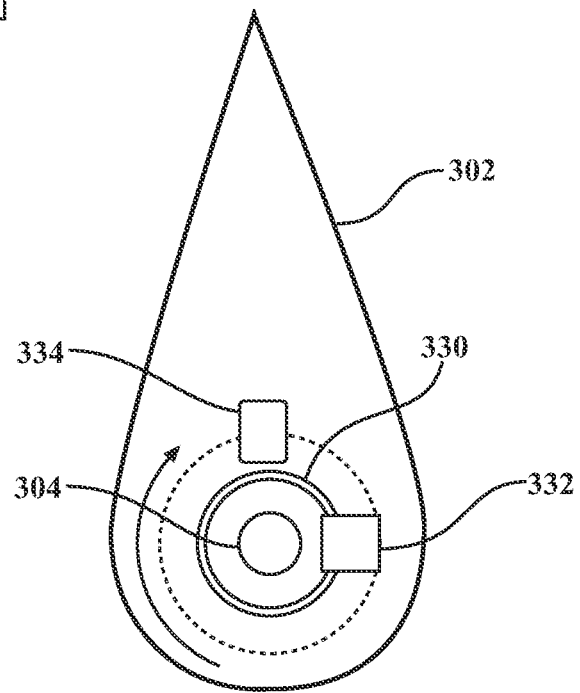

In FIGS. 3C and 3D, the fasteners, clamps, or a ring with ball bearings 330 attach the enclosure 302 to the line 304 while allowing rotation in the direction of the airflow. The fasteners, clamps, or a ring with ball bearings 330 may have a circular opening for the line 304. In one approach, the enclosure 302 may be in a tear-drop shape. The tear-drop shape may reduce a weight and drag penalty for a system using the sensor system 318. In particular, the tapering of the tear-drop shape may reduce drag caused by airflow directed toward a sensor measuring the speed of the airflow.

The enclosure 302 may be coupled to the magnetic sensor 332 and the magnet 334 to determine the direction of the airflow. In particular, the rotation of the enclosure 302 from airflow about the line 304 may be used by the magnetic sensor 332 to determine the direction of the airflow. The magnetic sensor 332 can determine, detect, track, or see the position of the magnet 334 according to changes in magnetic fields caused by rotation of the enclosure 302 about the line 304. The magnetic sensor may use the position to determine a direction or angle of the airflow. In one approach, the magnetic sensor 332 may be a MEMS to reduce weight of the enclosure 302. The magnetic sensor 332 may be coupled to either one of the fasteners, clamps, or a ring with ball bearings 330 used on the enclosure 302.

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an electrically programmable ROM (EPROM) or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and possible combinations of one or more of the associated listed items. As an example, the phrase "at least one of A, B, and C" includes A, B, C, or any combination thereof (e.g., AB, AC, BC or ABC).

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Aspects herein can be embodied in other forms without departing from the spirit or essential attributes thereof. Accordingly, reference should be made to the following claims, rather than to the foregoing specification, as indicating the scope hereof.

What is claimed is:

1. A sensor system comprising:
   a main body attached to a line;
   a directional sensor that determines direction of airflow according to a first rotation of the main body about the line;
   a generator coupled to the main body; and
   a flow sensor that measures speed of the airflow according to a vortex in open air generated from a second rotation of the generator about the line.

2. The sensor system of claim 1, further comprising:
   a receiver that receives speed and direction of airflow measurements for a plurality of altitudes associated with the line; and
   a transmitter that transmits the speed and the direction of the airflow measurements to a controller to forecast weather.

3. The sensor system of claim 2, wherein a device changes tension of the line according to a force on the line determined using the speed of the airflow measurements.

4. The sensor system of claim 1, wherein the main body is a tear-drop shape clamped to the line and the flow sensor is coupled to the main body.

5. The sensor system of claim 1, wherein the generator rotates unenclosed to generate the vortex in the open air when located above a minimum altitude and the first rotation and the second rotation correspond to the speed of the airflow.

6. The sensor system of claim 1, wherein the generator sheds the airflow to generate a Karman vortex according to a quadangular form of the generator.

7. The sensor system of claim 1, further comprising:
   a microelectromechanical system (MEMS) that determines an orientation of the sensor system; and
   the MEMS adjusts the determined direction of the airflow according to the orientation.

8. The sensor system of claim 1, wherein the flow sensor measures the speed of the airflow at a distance associated with a minimum multiple of a diameter of the generator.

9. A sensor system comprising:
   a main body attached to a control line of a flying device;
   a magnetic sensor that determines direction of airflow according to a first rotation of the main body about the control line;

a generator coupled to the main body; and a flow sensor that measures speed of the airflow according to a vortex in open air generated from a second rotation of the generator about the control line.

10. The sensor system of claim 9, further comprising:

a transceiver that receives speed and direction of airflow measurements for a plurality of altitudes associated with the control line; and the transceiver transmits the speed and the direction of the airflow measurements to a station to forecast weather.

11. The sensor system of claim 10, wherein a device changes tension of the control line according to a force on the control line determined using the speed of the airflow measurements.

12. The sensor system of claim 9, wherein the main body is a tear-drop shape clamped to the control line.

13. The sensor system of claim 9, wherein the generator rotates unenclosed to generate the vortex in the open air when located above a minimum altitude and the first rotation and the second rotation correspond to the speed of the airflow.

14. The sensor system of claim 9, wherein the generator sheds the airflow to generate a Karman vortex according to a quadangular form of the generator.

15. The sensor system of claim 9, further comprising:

a microelectromechanical system (MEMS) that determines an orientation of the sensor system; and the MEMS adjusts the determined direction of the airflow according to the orientation.

16. The sensor system of claim 9, wherein the flow sensor measures the speed of the airflow at a distance associated with a minimum multiple of a diameter of the generator.

17. A sensor system comprising:

a main body attached to a control line of a kite or a glider;

a magnetic sensor that determines direction of airflow according to a first rotation of the main body about the control line;

a generator coupled to the main body; and a flow sensor that measures speed of the airflow according to a vortex in open air generated from a second rotation of the generator about the control line that sheds the airflow.

18. The sensor system of claim 17, further comprising:

a receiver that receives speed and direction of airflow measurements for a plurality of altitudes associated with the control line; and a transmitter that transmits the speed and the direction of the airflow measurements to a controller to forecast weather.

19. The sensor system of claim 17, wherein the main body is a tear-drop shape clamped to the control line.

20. The sensor system of claim 17, wherein the generator rotates unenclosed to generate the vortex in the open air when located above a minimum altitude and the first rotation and the second rotation correspond to the speed of the airflow.

* * * * *